United States Patent
Filev et al.

(10) Patent No.: US 9,230,287 B2
(45) Date of Patent: Jan. 5, 2016

(54) REAL-TIME NOTIFICATIONS AND SHARING OF PHOTOS AMONG USERS OF A SOCIAL NETWORK

(75) Inventors: Momchil Dimitrov Filev, Novi, MI (US); Martin Brandt Freund, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 84 days.

(21) Appl. No.: 13/591,133

(22) Filed: Aug. 21, 2012

(65) Prior Publication Data

US 2014/0059139 A1 Feb. 27, 2014

(51) Int. Cl.
G06F 15/16 (2006.01)
G06Q 50/00 (2012.01)
H04L 12/58 (2006.01)
G06Q 10/10 (2012.01)

(52) U.S. Cl.
CPC ............... *G06Q 50/01* (2013.01); *G06Q 10/10* (2013.01); *H04L 51/32* (2013.01)

(58) Field of Classification Search
CPC ....... G06Q 50/01; H04L 12/588; H04L 51/32
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,555,110 B2 | 6/2009 | Dolan et al. | |
| 7,610,287 B1 | 10/2009 | Dean et al. | |
| 7,742,468 B2 | 6/2010 | Vagelos | |
| 7,958,193 B2 * | 6/2011 | Augustine et al. | 709/205 |
| 8,412,772 B1 * | 4/2013 | Nguyen et al. | 709/204 |
| 8,554,627 B2 * | 10/2013 | Svendsen et al. | 705/14.67 |
| 8,560,678 B2 * | 10/2013 | Tseng | 709/224 |
| 2002/0137490 A1 | 9/2002 | Gallant | |
| 2002/0143874 A1 | 10/2002 | Marquette et al. | |
| 2004/0258220 A1 | 12/2004 | Levine et al. | |

(Continued)

FOREIGN PATENT DOCUMENTS

JP 2010-5006748 1/2010
WO WO02079984 10/2002

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Lance L Barry
(74) *Attorney, Agent, or Firm* — Patent Law Works LLP (57) ABSTRACT

A system and method for sending a notification to a user in a social network is disclosed. A controller receives a first photo from a first user. The first user is associated with a social network. A identification module determines a first location of the first photo. The identification module determines a second location of a second user. The second user has a connection with the first user in the social network. The identification module determines that the first location matches the second location. A notification module sends a first notification to the second user. The first notification identifies the first photo. The controller receives a second photo taken at the second location. A determining engine determines to share the second photo with the first user.

20 Claims, 7 Drawing Sheets

(56) References Cited

U.S. PATENT DOCUMENTS

| | | | |
|---|---|---|---|
| 2005/0152521 | A1 | 7/2005 | Liljestrand |
| 2006/0026288 | A1 | 2/2006 | Acharya et al. |
| 2006/0077957 | A1 | 4/2006 | Reddy et al. |
| 2006/0206604 | A1 | 9/2006 | O'Neil et al. |
| 2007/0127631 | A1 | 6/2007 | Difiglia |
| 2007/0171898 | A1 | 7/2007 | Salva |
| 2007/0173236 | A1 | 7/2007 | Vishwanathan et al. |
| 2007/0248077 | A1 | 10/2007 | Mahle, Jr. et al. |
| 2008/0001747 | A1* | 1/2008 | Kangas .................. 340/572.1 |
| 2008/0056475 | A1 | 3/2008 | Brannick et al. |
| 2008/0140650 | A1 | 6/2008 | Stackpole |
| 2008/0192656 | A1 | 8/2008 | Vagelos |
| 2009/0327437 | A1 | 12/2009 | Estrada |
| 2011/0098156 | A1 | 4/2011 | Ng et al. |
| 2011/0137902 | A1 | 6/2011 | Wable et al. |
| 2011/0276637 | A1 | 11/2011 | Thornton et al. |
| 2012/0166433 | A1* | 6/2012 | Tseng ........................... 707/728 |
| 2013/0031489 | A1* | 1/2013 | Gubin et al. .................. 715/753 |
| 2013/0041948 | A1* | 2/2013 | Tseng ........................... 709/204 |
| 2013/0094702 | A1* | 4/2013 | Rodriguez .................... 382/103 |
| 2013/0097630 | A1* | 4/2013 | Rodriguez ....................... 725/32 |
| 2013/0132477 | A1* | 5/2013 | Bosworth et al. ............. 709/204 |
| 2013/0166651 | A1* | 6/2013 | Joshi ............................. 709/204 |
| 2014/0003648 | A1* | 1/2014 | Fedorovskaya et al. ...... 382/100 |
| 2014/0059139 | A1* | 2/2014 | Filev et al. .................... 709/205 |
| 2014/0089401 | A1* | 3/2014 | Filev et al. .................... 709/204 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

International Search Report and Written Opinion, PCT/US2013/055611 mailed May 7, 2014 (10 pages).

* cited by examiner

REAL-TIME NOTIFICATIONS AND SHARING OF PHOTOS AMONG USERS OF A SOCIAL NETWORK

BACKGROUND

The specification relates to sending a notification to a user in a social network.

Technology makes the sharing of information easy and fast. For example, people can share pictures taken by their families or friends that are posted on a social network. However, social network users can easily miss or forget about all the photos in the social network.

SUMMARY

According to one innovative aspect of the subject matter described in this disclosure, a controller receives a first photo from a first user, the first user being associated with a social network, a identification module determines, with one or more computing devices, a first location of the first photo, determines a second location of a second user, the second user having a connection with the first user in the social network, determines that the first location matches the second location, a notification module sends a first notification to the second user, the first notification identifying the first photo, the controller receives a second photo taken at the second location and a determining engine shares the second photo with the first user.

In general, another innovative aspect of the subject matter described in this disclosure may be embodied in methods that include receiving a first photo from a first user, the first user being associated with a social network, determining, with one or more computing devices, a first location of the first photo, determining a second location of a second user, the second user having a connection with the first user in the social network, determining that the first location matches the second location, sending a first notification to the second user, the first notification identifying the first photo, receiving a second photo taken at the second location and sharing the second photo with the first user. Other aspects include corresponding methods, systems, apparatus, and computer program products.

These and other implementations may each optionally include one or more of the following features. For instance, operations further include determining whether to share the second photo with the first user based on an affinity score between the first user and the second user. Operations further include determining whether to share the second photo with the first user based on a threshold amount of interactions between the first user and the second user. Operations further include applying a first category to the first photo, receiving a second category from the second user and filtering the first photo based on whether the first category matches the second category, wherein sending the first notification to the second user is responsive to the first category matching the second category. Operations further include applying a first category to the first photo and generating graphical data for displaying a heat map associated with the first category that includes an indicator to signify that the first photo is related to the first category. Operations further include sending a second notification to the first user and receiving a reaction from the first user responsive to receiving the second notification. Operations further include sending a second notification to a group associated with the first user in the social network, the second notification identifying the second photo. Operations further include determining timestamps associated with the first photo and the second photo and wherein the second notification includes an indication of a time that elapsed between taking the first photo and the second photo.

For instance, the features further include determining the first location by extracting metadata from the first photo. The features further include determining the first location by receiving a user input from the first user about the first location. The features further include sending the second notification to the first user by at least one of putting the second notification in a stream of the social network and displaying a direct message in a notification box.

The specification advantageously describes a system and method for sending a real-time notification to a user in a social network about a picture taken by the user's connections in the user's location such that the user can benefit from the picture.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
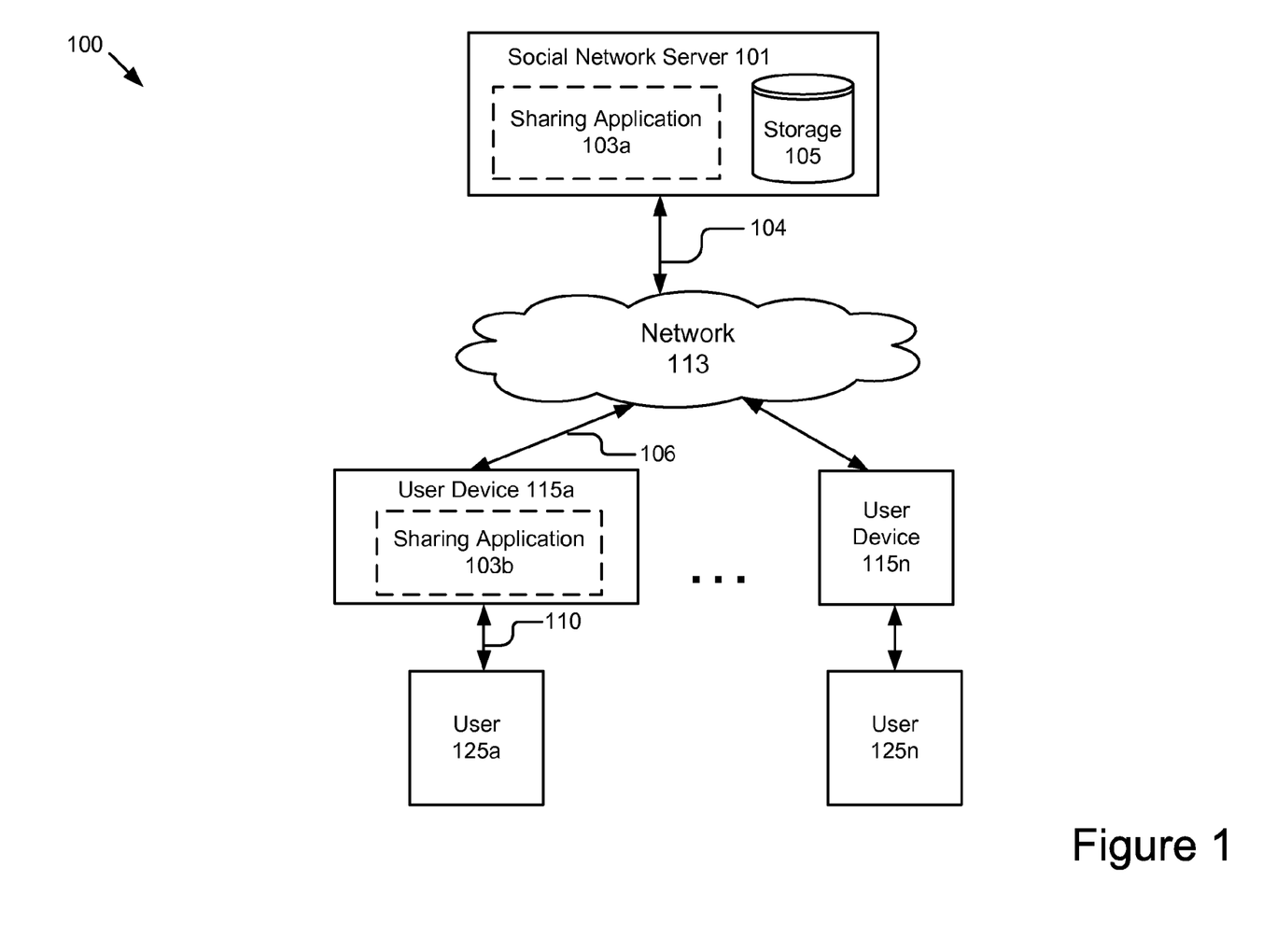
FIG. 1 is a block diagram illustrating an example system for notifying a user in a social network when the user is in a location where someone connected to the user in the social network took a photo.

FIG. 1 illustrates a block diagram of a system 100 for notifying a user in a social network when the user is in a location where someone connected to the user in the social network took a photo. The illustrated system 100 for notifying the user includes user devices 115a, 115n that are accessed by users 125a, 125n and a social network server 101. In the illustrated example, these entities are communicatively coupled via a network 113. In FIG. 1 and the remaining figures, a letter after a reference number, for example, "115a" is a reference to the element having that particular reference number. A reference number in the text without a following letter, for example, "115" is a general reference to different instances of the element bearing that reference number. Although only two devices are illustrated, persons of ordinary skill in the art will recognize that arbitrary number of user devices 115n is available to arbitrary number of users 125n.

In some instances, the sharing application 103a is operable on the social network server 101, which is coupled to the network 113 via signal line 104. Although only one social network server 101 is shown, persons of ordinary skill in the art will recognize that multiple servers can be present. The social network server 101 can include software for generating a social network. The social network includes relationships that are defined in a social graph. The social graph is a mapping of users in a social network and how they are related to each other.

In other instances, the sharing application 103b is stored on a user device 115a, which is connected to the network 113 via signal line 106. In one example, the sharing application 103b is a thin-client application that includes part of the sharing application 103 on the user device 115a and part of the sharing application 103 on the social network server 101 to notify the user when the user is in a location where someone connected to the user in the social network took a photo. The user 125a interacts with the user device 115a via signal line 110. The user device 115a, 115n can be a computing device, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network.

The network 113 is a conventional type, wired or wireless, and has arbitrary number of configurations, for example, as a star configuration, token ring configuration or other configurations known to those skilled in the art. Furthermore, the network 113 includes a local area network (LAN), a wide area network (WAN) (e.g., the Internet), and/or other interconnected data paths across which multiple devices can communicate. In yet other instances, the network 113 is a peer-to-peer network. The network 113 is also coupled to or includes portions of a telecommunications network for sending data in a variety of different communication protocols. In some instances, the network 113 includes Bluetooth communication networks or a cellular communications network for sending and receiving data, for example, via short messaging service (SMS), multimedia messaging service (MMS), hypertext transfer protocol (HTTP), direct data connection, WAP, email, etc.

The sharing application 103 sends a notification to a user in a social network when the user is in a location where someone connected to the user in the social network took a photo. For example, when Molly and Dave are touring Yosemite and they stop by Wapama Falls, they might be interested to know that their friend John took a picture in the same location. In some instances, after a second user receives a notification about a photo from a first user, the second user takes a second photo in the same location and the sharing application 103 sends the second photo to the first user. Continuing with the example above, John might be interested in seeing a photo from his friends taken in the same location.

In some instances, the notification includes the time that elapsed between the two photos. In some other instances, the sharing application 103 categorizes photos and the user can filter images based on the category. For example, a user is touring New York City and wants to see pictures of food from the user's connections in the user's location to determine where to eat dinner. In some instances, the sharing application 103 displays content in a heat map. For example, the user can determine whether in New York City people take a lot of pictures because that area could be of interest. The heat map can be further filtered according to categories so the user can see the best places for the user to take photos of sunsets in New York City.

The storage device 105 is a non-volatile memory device or similar persistent storage media for storing instructions and/or data used for notifying a user when the user is in a location where someone connected to the user in a social network took a photo. The storage device 105 is communicatively coupled to the sharing application 103a.

Figure 2A:
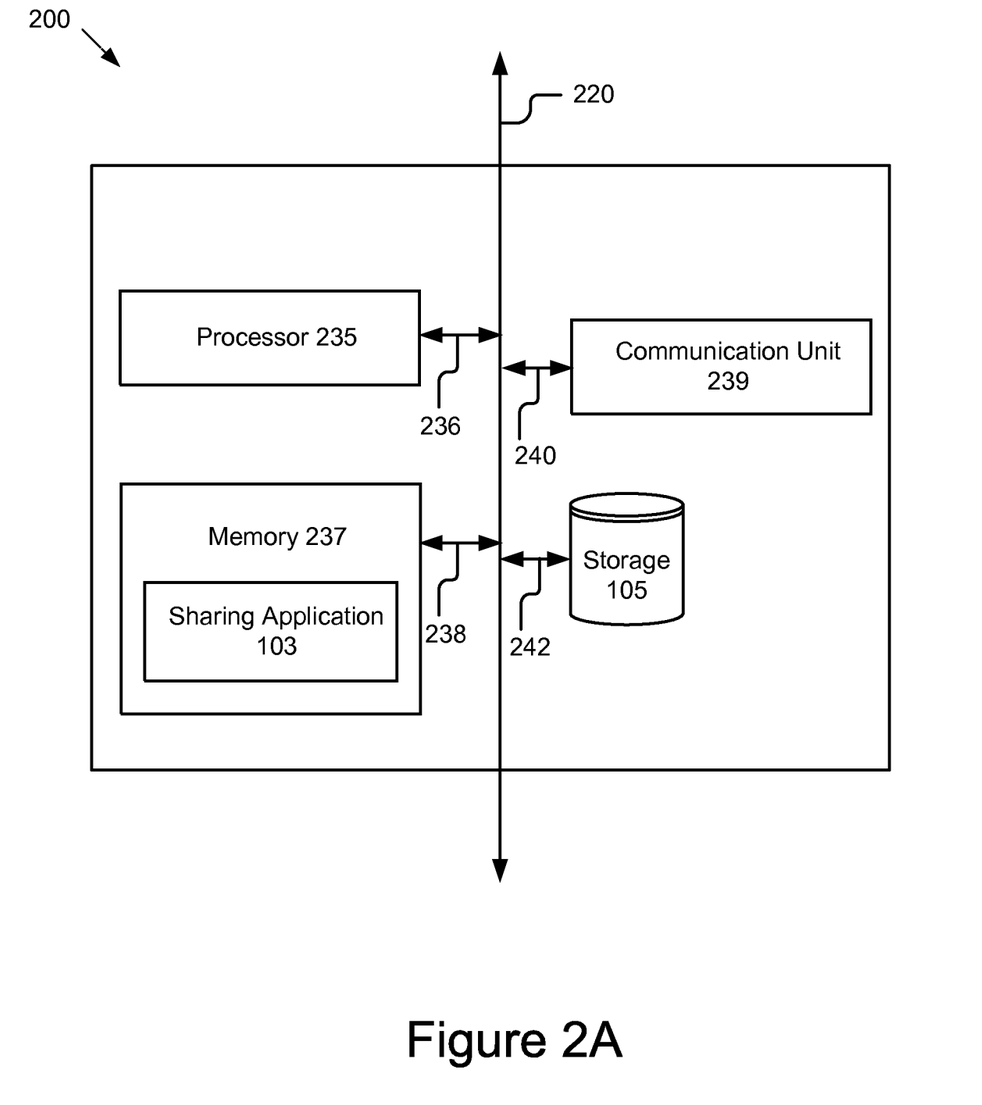
FIG. 2A is a block diagram illustrating one instance of hardware implementing the functionality of notifying a user in a social network.

Referring now to FIG. 2A, example hardware implementing the functionality of notifying a user in a location of a photo taken in the location by another user connected to the user in a social network is shown in more detail. FIG. 2A is a block diagram of a computing device 200 that includes a processor 235, memory 237, storage 105 and a communication unit 239. In some instances, the computing device 200 is the social network server 101. In other instances, the computing device 200 is the user device 115a.

The processor 235 includes some or all of an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may include various computing architectures including a complex instruction set computer (CISC) architecture, a reduced instruction set computer (RISC) architecture, or an architecture implementing a combination of instruction sets. Although only a single processor is shown in FIG. 2A, multiple processors are included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. The memory 237 is coupled to the bus 220 for communication with the other components via signal line 238. The instructions and/or data may include code for performing any and/or all of the techniques described herein. The memory 237 may be a dynamic random access memory (DRAM) device, a static random access memory (SRAM) device, flash memory or some other memory device known in the art. In some instances, the memory 237 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 239 transmits and receives data to and from the computing device 200. The communication unit 239 is coupled to the bus 220 via signal line 240. In some instances, the communication unit 239 includes a port for direct physical connection to the network 113 or to another communication channel. For example, the communication unit 239 includes a USB, SD, CAT-5 or similar port for wired communication with the user device 115. In other instances, the communication unit 239 includes a wireless transceiver for exchanging data with the user device 115 or any other communication channel using one or more wireless communication methods, such as IEEE 802.11, IEEE 802.16, BLUETOOTH® or another suitable wireless communication method.

In other instances, the communication unit 239 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In other instances, the communication unit 239 includes a wired port and a wireless transceiver. The communication unit 239 also provides other conventional connections to the network for distribution of files and/or media objects using standard network protocols such as TCP/IP, HTTP, HTTPS and SMTP as will be understood to those skilled in the art.

Figure 2B:
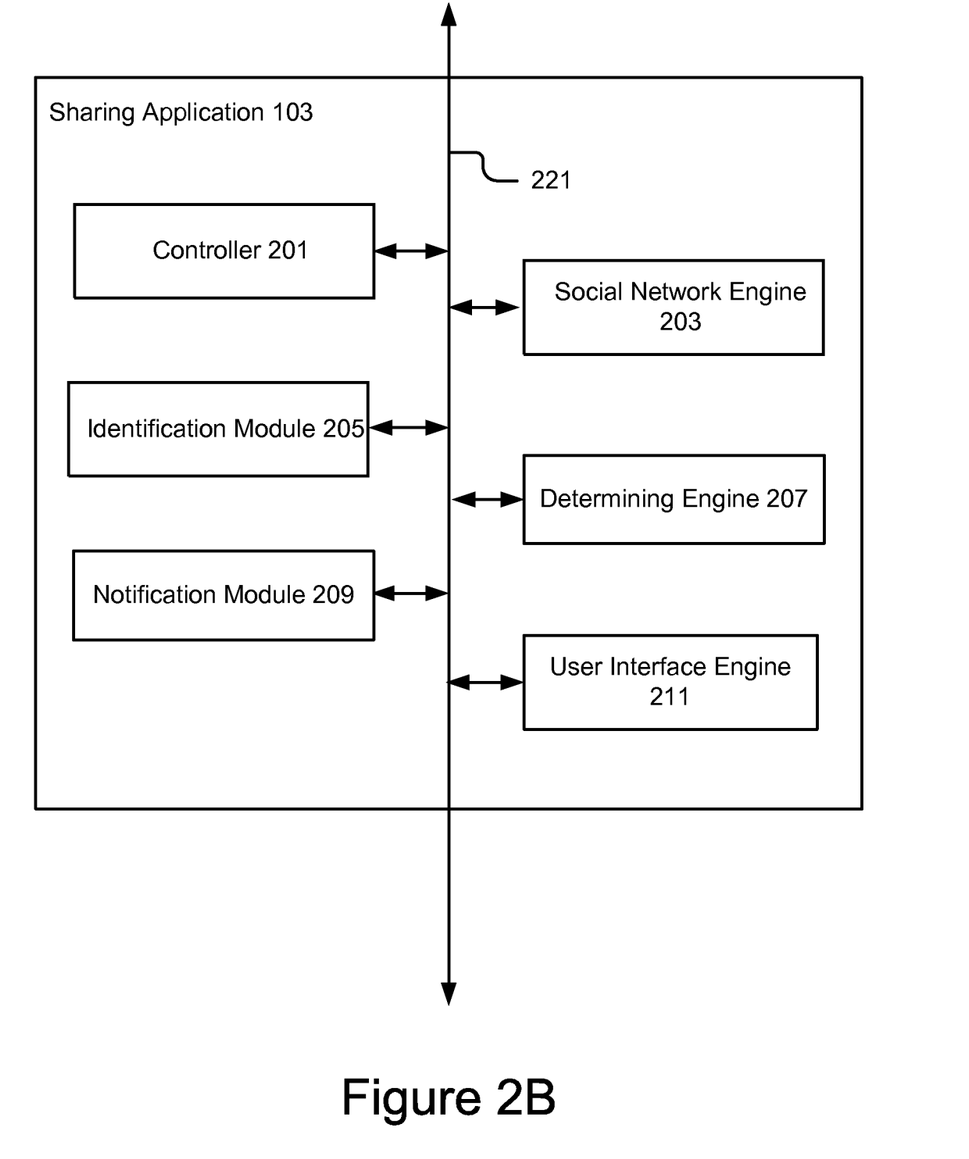
FIG. 2B is a block diagram illustrating an example sharing application.

Referring now to FIG. 2B, an example sharing application 103 is shown in more detail. In some instances, the sharing application 103 includes a controller 201, a social network engine 203, an identification module 205, a determining engine 207, a notification module 209 and a user interface engine 211 that communicate over the software communication mechanism 221. Software communication mechanism 221 may be an object bus (such as CORBA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc.). The software communication can be implemented on any underlying hardware, such as a network, the Internet, a bus 220, a combination thereof, etc.

The controller 201 can be software including routines for receiving data and transmitting the data to an appropriate component. In some instances, the controller 201 can be a set of instructions executable by the processor 235 to provide the functionality described below for receiving and transmitting the data. In other instances, the controller 201 can be stored in the memory 237 of the computing device 200 and can be accessible and executable by the processor 235. The controller 201 may be adapted for cooperation and communication with the processor 235 and other components of the computing device 200 via the software communication mechanism 221.

In some instances, the controller 201 receives data via the communication unit 239 and transmits the data to the appropriate module of the sharing application 103. For example, the controller 201 receives a first photo via the communication unit 239 and transmits the first photo to the identification module 205 for determining a location of the first photo. The controller 201 also transmits responses (e.g., a second photo) to the communication unit 239 for transmission to the client device 115. In other instances, the controller 201 receives data (e.g., affinity scores, user interactions, etc.) from the social network engine 203 and transmits the data to an appropriate component. In other instances, the controller 201 receives data from a user interface generated by the user interface engine 211 and transmits the data to an appropriate component. In one example, the controller 201 receives an input about a location of a photo from a user via a user interface and sends the user input to the identification module 205. In another example, the controller 201 receives a category from a user via a user interface and sends the category to the determining engine 207.

The social network engine 203 can be software including routines for generating and managing a social network. In some instances, the social network engine 203 can be a set of instructions executable by the processor 235 to provide the functionality described below for generating and managing the social network. In other instances, the social network engine 203 can be stored in the memory 237 of the computing device 200 and can be accessible and executable by the processor 235. The social network engine 203 may be adapted for cooperation and communication with the processor 235 and other components of the computing device 200 via the software communication mechanism 221.

In some instances, the social network engine 203 manages registration of users and creation of a user profile. The social network engine 203 also manages the association of different actions with the user profile including the publication of posts (e.g. text, links or media) to a selected audience, the publication of comments, indications of acknowledgement (e.g. approval, disapproval, thumbs up, thumbs down, like, dislike, etc.), uploading of media (e.g. photos, videos, etc.), check-ins to different locations and other actions associated with a social network.

In some instances, the social network engine 203 creates a social graph and an interest graph that are stored in the storage 105. The social graph includes the relationship between people in a social network and the interest graph that includes interests associated with the users. For example, when a first user follows a second user, the relationship is a first-degree relationship. If the second user follows a third user that the first user does not follow, the first user has a second-degree relationship with the third user. This relationship can also be described in terms of social affinity. The first user has a closer social affinity to the second user than the third user.

In some instances, the social network engine 203 also generates an affinity score between a pair of users in the social network. For example, the social network engine 203 generates a high affinity score for two users that follow each other and that frequently interact with each other. The social network engine 203 regularly updates the affinity score between the users. For example, if a first user removes a second user from a group or stops being friends with the second user, the social network engine 203 reduces the affinity score between the first and second users to reflect the relationship change. The social network engine 203 transmits the data (e.g., user activity data, affinity scores, social graph information, etc.) to the controller 201 for processing and organizing with other data sources.

The identification module 205 can be software including routines for determining a location of a photo or a user and generating location-related information. In some instances, the identification module 205 can be a set of instructions executable by the processor 235 to provide the functionality described below for determining the location and generating the location-related information. In other instances, the identification module 205 can be stored in the memory 237 of the computing device 200 and can be accessible and executable by the processor 235. The identification module 205 may be adapted for cooperation and communication with the processor 235 and other components of the computing device 200 via the software communication mechanism 221.

In some instances, the identification module 205 receives a photo via the controller 201 and determines a location of the photo. In some instances, the identification module 205 extracts metadata from the photo and determines the location of the photo based on the metadata. For example, the identification module 205 determines where a photo was taken by extracting a location tag associated with the photo. In other instances, the identification module 205 determines the location of the photo from user input that specifies the location of the photo. In other instances, the identification module 205 performs image recognition on the photo to determine the location of the photo. For example, the identification module 205 recognizes that the building on a photo is Chrysler Building and determines that the photo was taken in New York City.

In other instances, the identification module 205 also determines a physical location of a user associated with a social network. In some instances, the identification module 205 processes the user activity data associated with the user received via the controller 201 and determines the location of the user. For example, the identification module 205 determines the location of the user using a global positioning system (GPS), multilateration of radio signals between radio towers of the network, handset-based location, network-based location, etc. For example, the identification module 205 uses a GPS in a mobile phone or a car to determine the location of the user. In other instances, the identification module 205 determines the location of the user based on an internet protocol (IP) address. For example, the identification module 205 determines that the user is in a library from the IP address that the user is used to upload an image in the social network. In other instances, the identification module 205 receives a post showing that "I am looking at Golden Gate Bridge in the sunset. It is more beautiful than 1 have ever imaged." passed by the controller 201 and determines from the context of the post that the user who sent the post is now in San Francisco. In other instances, the identification module 205 receives the location of the user from a user input.

The identification module 205 determines whether a first location matches a second location. In some instances, the identification module 205 determines a match if the first location is same as the second location. In other instances, the identification module 205 determines a match for a user if the first location is within a certain range of the second location. The range can be automatically set by the identification module 205 or specified by the user. For example, the identification module 205 determines that locations within a 5-mile radius match with each other for John based on a 5-mile radius criterion specified by John. This is particularly helpful when the user is visiting a remote location, for example, Arches in Utah because the park covers a large amount of terrain.

In some instances, the identification module 205 determines a first location of a first photo received from a first user, determines a second location of a second user who connects with the first user in a social network and determines whether the first location and the second location match. A location match represents that the second user is currently in a location where one of the second user's connections in the social network, i.e., the first user, took a photo. The location match may cause the notification module 209 to notify the second user of the first photo. The second user can perform an action responsive to receiving the notification, for example, taking a second photo in the second location.

In some instances, the identification module 205 generates location-related information once a location of a photo is determined. In some instances, the identification module 205 applies a category to the photo and tags the photo with the category and the location. The identification module 205 determines the category by, for example, performing image recognition on the photo, associating the name of the location with the photo (e.g., Yosemite) or identifying a tag provided by the user. The category includes a restaurant category, a theater category, a museum category, a hotel category, etc. For example, the identification module 205 recognizes a restaurant in San Diego and tags the photo with "restaurant, San Diego." In other instances, the identification module 205 applies a category to the photo and incorporates with the user interface engine 211 to generate graphical data for displaying a heat map associated with the category. In particular, the identification module 205 instructs the user interface engine 211 to include an indicator in the heat map. The indicator signifies that the photo is related to the category. For the example above, the identification module 205 can communicate with the user interface engine 211 to generate a heat map to list the most popular restaurants in San Diego based on the photo tagged with "restaurant, San Diego." The heat map also includes a star icon that marks the particular restaurant shown on the photo or links to the photo or the particular restaurant. In some other instances, the identification module 205 can further filter the heat map according to categories. Continuing with the example above, the identification module 205 further categorizes the heat map to display the best Italian restaurants in San Diego.

In some instances, the identification module 205 stores determined locations, a location match and location-related information in the storage 105. In other instances, the identification module 205 transmits the determined locations and the location-related information to the determining engine 207 and the notification module 209 for sending a notification based on the location match. For example, the identification module 205 receives a photo from Mary via the controller 201 and determines that the photo was taken in the upper fall in Yosemite. The identification module 205 applies a "rainbow" category to the photo because the image includes a rainbow. The identification module 205 also determines that Sarah is in the lower fall in Yosemite. Mary and Sarah are friends in the social network. The identification module 205 determines that the location of Mary's photo (i.e., the upper fall) matches the location of Sarah (i.e., the lower fall) based on a criterion (e.g., 5-mile distance) specified by Sarah. Sarah may receive a notification including Mary's photo based on the location match. Responsive to receiving the notification, Sarah can take a new photo in the lower fall and share the new photo with Mary and other friends, while Mary can comment on the new photo or share the new photo with her friends. In other instances, the identification module 205 transmits the location-related information (e.g., a heat map) to the notification module 209 for notifying a user of information in a category. Continuing with the example above, the identification module 205 generates a heat map based on the photo from Mary showing areas in Yosemite that people like to take photos of rainbows. Sarah can receive a notification including the heat map and choose where to take photos of rainbows based on the heat map.

The determining engine 207 can be software including routines for determining whether to send a real-time notification to a user and determining whether to share a photo with users. In some instances, the determining engine 207 can be a set of instructions executable by the processor 235 to provide the functionality described below for determining whether to send the notification to the user and determining whether to share the photo with the users. In other instances, the determining engine 207 can be stored in the memory 237 of the computing device 200 and can be accessible and executable by the processor 235. The determining engine 207 may be adapted for cooperation and communication with the processor 235 and other components of the computing device 200 via the software communication mechanism 221.

In some instances, the identification module 205 determines a first location of a first photo received from a first user and a second location of a second user who has a connection with the first user in a social network. The identification module 205 determines a match between the first location and the second location and sends the location match and the information related to the first and second locations to the determining engine 207. The determining engine 207 determines whether to notify the second user of the first photo.

In some instances, the determining engine 207 receives an affinity score between the first user and the second user from the social network engine 203 and determines whether to notify the second user of the first photo based on the affinity score. For example, the determining engine 207 determines to send a notification to the second user if the affinity score between the two users is greater than a specific value. In another example, users with a first-degree connection have a higher affinity score that exceeds a threshold than users with a second-degree connection and, as a result, the determining engine 207 determines to send a notification to users with first-degree connections.

In some instances, the determining engine 207 determines whether to notify the second user of the first photo based on a threshold amount of interactions between the first user and the second user. For example, if the first user communicated with the second user once in the past few years, the determining engine 207 determines not to send a notification to the second user. However, if the first user and the second user have interacted with each other a couple of times in the past year, the determining engine 207 determines to send the notification to the second user to enhance the connection between the two users.

In some instances, the determining engine 207 retrieves notification parameters from the notification module 209 to determine whether to notify the second user of the first photo. In some instances, the determining engine 207 determines whether to notify the second user of the first photo based on the notification parameters configured for the first user (i.e., the sender). The notification parameters configured for the sender include which users the sender wants to send a notification to (e.g., everyone, specific groups of the sender or specific users in the social network), what content a notification may have, which photos can be used to trigger sending of a notification, when a type of notification can be sent to a specific recipient, etc. The groups can include, for example, a photography group or a travel group that would be particularly interested in the user's photos. For example, the determining engine 207 determines not to send a notification including the first photo to the second user since the first photo is not selected by the first user as a photo that triggers a notification.

In some instances, the determining engine 207 also determines whether to notify the second user of the first photo based on the notification parameters configured for the second user (i.e., the recipient). The notification parameters configured for the recipient include which users the recipient wants to receive a notification from (i.e., everyone, specific groups that recipient follows or specific users in the social network), when a type of notification can be received, which type of notification is preferred, etc. For example, regardless of a number of interactions and the affinity score, the second user wants to see photos from particular people, for example, celebrities because they are interesting to the second user. For example, the determining engine 207 determines to send an email notification to the second user based on a preference of the second user.

In some instances, the determining engine 207 also determines whether to notify the second user of the first photo based on filtering the first photo according to a category. The determining engine 207 receives a first photo tagged with a first category from the identification module 205, receives a second category from the second user, filters the first photo based on whether the first category matches the second category and determines to send a notification including the first photo to the second user based on a category match. For example, the determining engine 207 receives a first category from a first photo tagged with "restaurant, San Diego" taken by a first user. The determining engine 207 receives a second category from a second user when the second user who is visiting San Diego posted or searched "places for dinner," "best pizza" or similar subjects in a social network where the first user and the second user are members of a travel group. The determining engine 207 determines that the first category (e.g., restaurant) matches the second category (e.g., restaurant, food) and instructs the notification module 209 to send a notification to the second user about the first photo based on the category match. If the first user and the second user are close friends who have similar food tastes, the second user may decide to have dinner in the restaurant shown in the first photo.

In some instances, the determining engine 207 also determines whether to notify the second user of the first photo based on time factors. The determining engine 207 determines a first time of the first photo being taken in the first location and a second time of the second user being in the second location. In one example, if the time difference between the first time and the second time is within a specific threshold time, the determining engine 207 determines to send the notification. In another example, the determining engine 207 determines to notify the second user of the first photo if this photo was taken at a most recent time among other photos taken by the first user in the first location.

In some instances, the determining engine 207 combines the affinity score, the threshold amount of interactions, the notification parameters configured for the sender and the recipient, the filtering result for the first photo and time factors to determine whether to send a notification including the first photo to the second user.

Once the second user in the second location receives a real-time notification of the first photo taken in the first location from the first user, the second user performs an action responsive to receiving the notification. For example, the second user can have dinner at a restaurant shown on the first photo or enjoy music in a place shown on the heat map associated with a music category applied to the first photo. A typical action performed by the second user is to take a second photo in the second location. Responsive to receiving the second photo via the controller 201, the determining engine 207 determines whether to send a second notification to the first user. In some instances, the second notification includes the second photo. When the determining engine 207 determines to send the second notification to the first user, the determining engine 207 shares the second photo with the first user. In other instances, the determining engine 207 determines whether to send a second notification including the second photo to the first user and a group associated with the first user in the social network for sharing the second photo with the first user and the group.

The determining engine 207 determines whether to send a second notification to the first user or share the second photo with the first user based on the affinity score, the threshold amount of interactions, the notification parameters configured for the sender and the recipient and time factors as described above. For example, the determining engine 207 determines to share the second photo with the first user if the first user and the second user frequently talk to each other on a social network and the time difference between the time stamps associated with the first photo and the second photo is within a threshold.

The notification module 209 can be software including routines for incorporating with the determining engine 207 to send a real-time notification to a user. In some instances, the notification module 209 can be a set of instructions executable by the processor 235 to provide the functionality described below for sending the notification to the user. In other instances, the notification module 209 can be stored in the memory 237 of the computing device 200 and can be accessible and executable by the processor 235. The notification module 209 can be adapted for cooperation and communication with the processor 235 and other components of the computing device 200 via the software communication mechanism 221.

The notification module 209 sends a real-time notification to a user responsive to receiving a positive determination of sending the notification from the determining engine 207. In some instances, the notification module 209 sends a first notification to a second user about a first photo received from a first user. Once the second user takes a second photo, the notification module 209 also sends a second notification to the first user about the second photo. For example, when Molly and Dave are touring Yosemite and they stop by Wapama Falls, they might be interested to know that their friend John took a picture in the same location. The determining engine 207 determines to notify Molly and Dave (i.e., the second user) of the photo from John (i.e., the first user) based on the fact that they both were located in Wapama Falls and other conditions described above. The notification module 209 sends the first notification including the first photo from John to Molly and Dave. Responsive to receiving the first notification, Molly and Dave take a second photo in Wapama Falls and want to share the photo with John. The notification module 209 sends a second notification to John for sharing the second photo based on a positive determination from the determining engine 207. In some instances, the controller 201 receives the reactions from the first user responsive to receiving the second notification. For the above example, John may comment on the new photo or share the new photo with his groups.

The notification module 209 determines the content of a notification. In some instances, the notification module 209 includes time that elapsed between taking the first photo and the second photo in the second notification. In other instances, the notification module 209 determines the content of a notification from instructions received from a user. For example, the notification module 209 includes a "Hello" message or a comment of a picture from the sender in a notification.

The notification module 209 also selects how to send a notification. For example, the notification module 209 can send a notification by sending an email, sending an instant message, putting the notification in a stream of a social network or displaying a direct message in a notification box. In some instances, the notification module 209 determines how to send a notification from instructions received from a user.

In some instances, the notification module 209 configures notification parameters used by the determining engine 207 for determining whether to send a notification to a user. The notification module 209 determines notification parameters for the sender that include, but are not limited to, whom the sender wants to send the notification to, what content the notification may have, what photos can be used to trigger sending of the notification, when a type of notification can be sent to a specific recipient. The notification module 209 also determines notification parameters for the recipient that include, but are not limited to, whom the recipient wants to receive a notification from, when a type of notification can be received and which type of notification is preferred.

The user interface engine 211 can be software including routines for generating a user interface that displays user profiles (e.g. posts, name, education, working history), user inputs and a social network (e.g. posts, photos, videos, comments). In some instances, the user interface engine 211 can be a set of instructions executable by the processor 235 to provide the functionality described below for generating the user interface. In other instances, the user interface engine 211 can be stored in the memory 237 of the computing device 200 and can be accessible and executable by the processor 235. The user interface engine 211 can be adapted for cooperation and communication with the processor 235 and other components of the computing device 200 via the software communication mechanism 221.

In some instances, each time the notification module 209 sends a notification to a user, the user interface engine 211 generates graphical data for displaying the notification on a user interface. For example, when the notification module 209 sends a notification to the second user to inform the second user that the first user took a photo in the location that the second user is currently in, the user interface engine 211 generates graphical data for displaying the notification and the photo from the first user on a pop-up notification box appeared on the screen of the second user's phone. In some instances, the notification box is color coded or symbolically coded so that the second user would not miss the information.

In some instances, the user interface engine 211 generates a user interface to receive a user input, for example, a location of a photo or a category applied to the photo. In other instances, the user interface engine 211 generates graphical data for displaying content of a heat map associated with a category. For example, the user interface engine 211 generates graphical data for displaying areas in New York City where people frequently shop.

Figure 3:
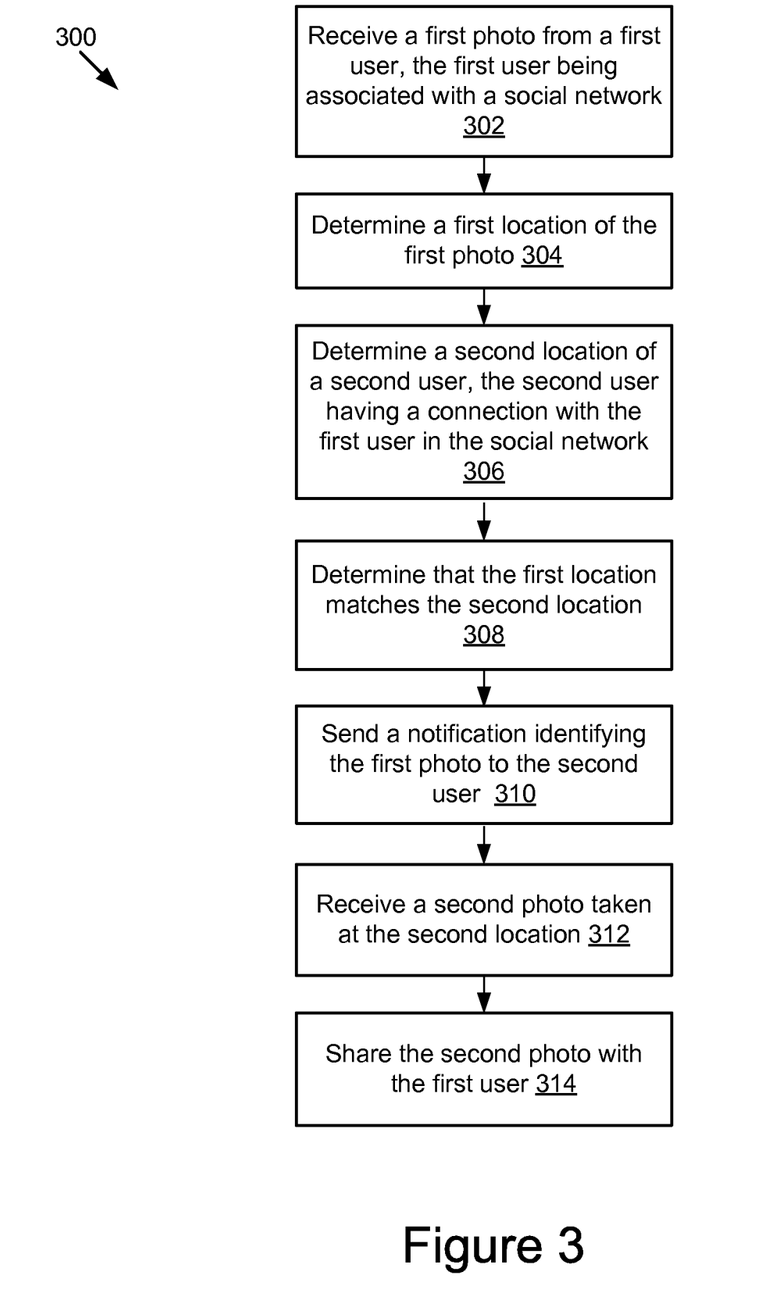
FIG. 3 is a flowchart of an example method for notifying a user in a social network.

Referring now to FIGS. 3, 4A, 4B and 5, various example methods and graphic representations of example user interfaces of the specification will be described. FIG. 3 includes a flowchart 300 of an example method for using a sharing application 103 to notify a user in a social network when the user is in a location where someone connected to the user in the social network took a photo. The sharing application 103 includes a controller 201, a identification module 205, a determining engine 207 and a notification module 209. The controller 201 receives 302 a first photo from a first user. The first user is associated with a social network. The identification module 205 determines 304 a first location of the first photo. For example, the identification module 205 identifies the location from metadata generated by a user device 115 at the time the photo was taken or from a location input by the first user. The identification module 205 determines 306 a second location of a second user. The second user is connected to the first user in the social network. The identification module 205 also determines 308 that the first location matches the second location. For example, the identification module 205 determines matching is defined as the first location being within a five mile radius of the second location and because the first location is a mile away from the second location, the first location matches the second location. The notification module 209 sends 310 a notification to the second user identifying the first photo. The second user takes a second photo at the second location responsive to receiving the notification including the first photo. The controller 201 receives 312 the second photo. The determining engine 207 shares 314 the second photo with the first user.

Figure 4A:
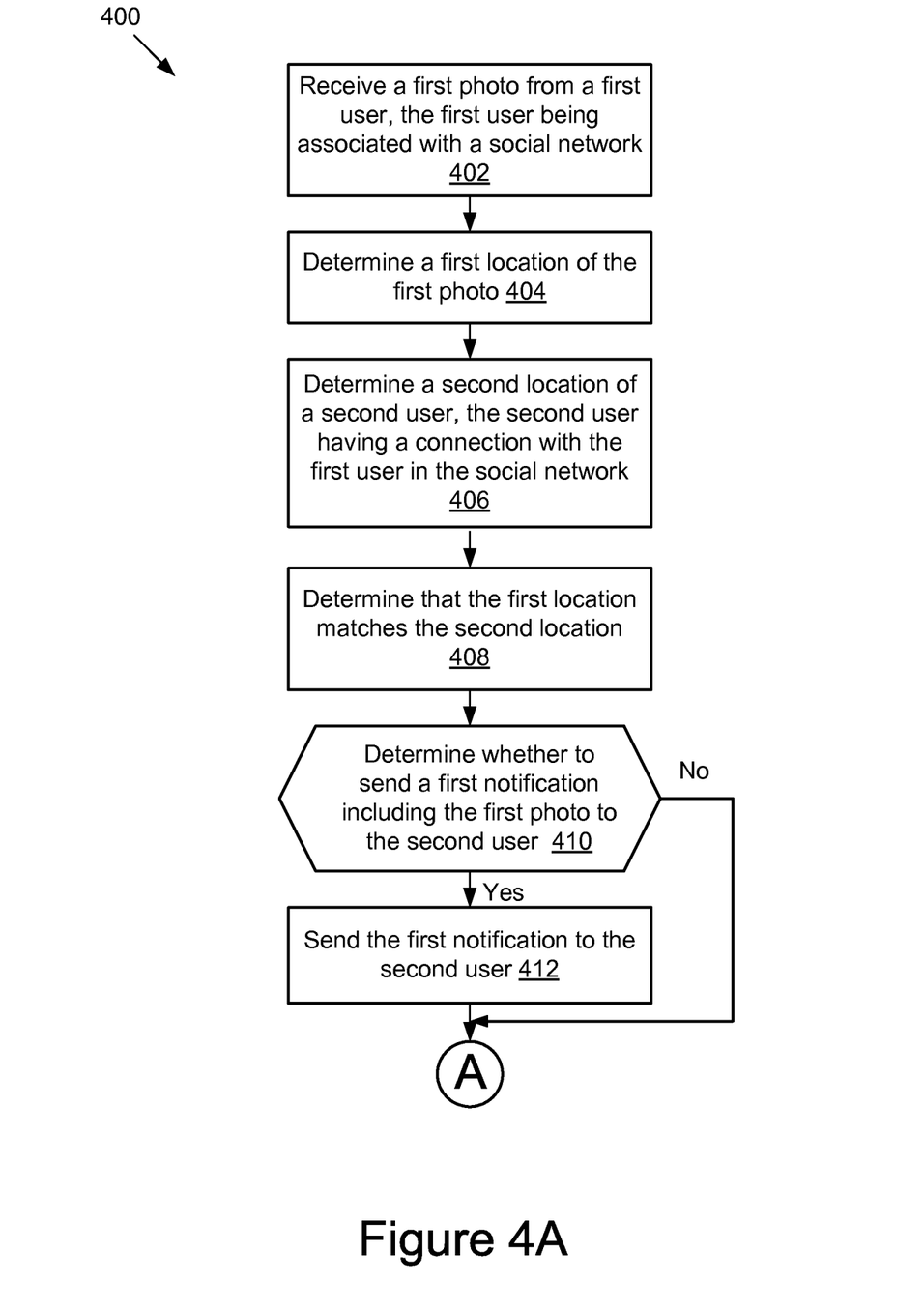
FIGS. 4A and 4B are flowcharts of an example method for notifying a user in a social network.
Figure 4B:
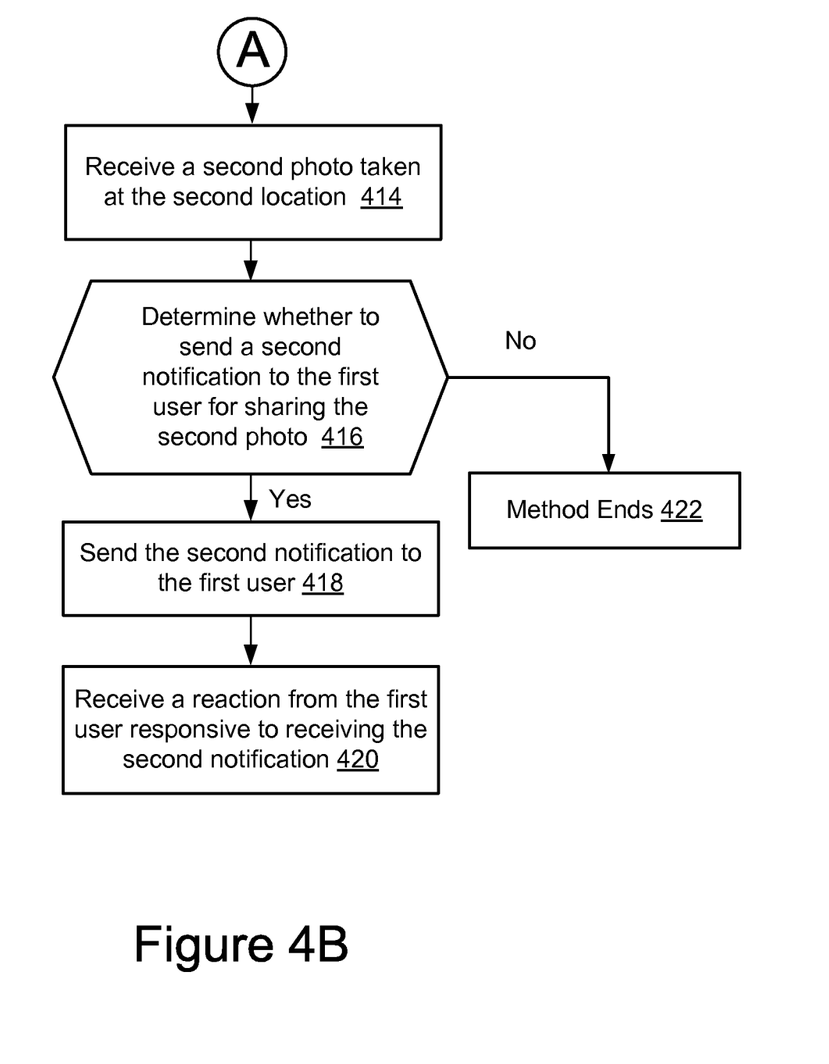

FIGS. 4A and 4B include flowcharts 400 of an example method for using a sharing application 103 to notify a user in a social network when the user is in a location where someone connected to the user in the social network took a photo. The sharing application 103 includes a controller 201, a social network engine 203, a identification module 205, a determining engine 207, a notification module 209 and a user interface engine 211.

Referring now to FIG. 4A, the controller 201 receives 402 a first photo from a first user that is associated with a social network. The controller 201 transmits the first photo to the identification module 205.

The identification module 205 determines 404 a first location of the first photo. In some instances, the identification module 205 extracts metadata from the first photo and determines the location of the first photo based on the metadata. In other instances, the identification module 205 determines the location of the first photo from a user input that specifies the location of the first photo. In other instances, the identification module 205 performs image recognition on the first photo to determine the location of the first photo.

The identification module 205 determines 406 a second location of a second user. The second user has a connection with the first user in the social network. In some instances, the identification module 205 processes the user activity data associated with the second user received via the controller 201 and determines the second location of the second user. In other instances, the identification module 205 determines the second location of the second user from a GPS, an IP address or a user input specifying the second location.

The identification module 205 determines 408 that the first location matches the second location if the two locations are same or within a certain range. The identification module 205 sends the first photo, the first location, the second location, the location match and other location-related information to the determining engine 207.

The determining engine 207 determines 410 whether to send a first notification including the first photo to the second user. In some instances, the determining engine 207 determines whether to notify the second user of the first photo based on an affinity score between the first user and the second user. In other instances, the determining engine 207 determines whether to notify the second user of the first photo based on a threshold amount of interactions. In some other instances, the determining engine 207 also determines whether to send the first notification based on notification parameters for both the sender (i.e., the first user) and the recipient (i.e., the second user), filtering the first photo according to a category and time factors. If the determining engine 207 determines to send the first notification, the method 400 moves to step 412. Otherwise, the method 400 moves to step 414.

The notification module 209 sends 412 the first notification to the second user. In some instances, the notification module 209 sends the first notification by sending an email, sending an instant message, putting the first notification in a stream of a social network or displaying a direct message in a notification box. The user interface engine 211 generates graphical data for displaying the first notification on a user interface.

Referring now to FIG. 4B, the second user takes a second photo in the second location responsive to receiving the first notification. The controller 201 receives 414 the second photo taken at the second location and passes the second photo to the determining engine 207. The determining engine 207 determines 416 whether to send a second notification to the first user for sharing the second photo. The determining engine 207 determines whether to send the second notification based on an affinity score, a threshold amount of interactions, etc. For example, the determining engine 207 determines to share the second photo with the first user if the first user and the second user frequently talk to each other on a social network and the time difference between the time stamps associated with the first photo and the second photo is within a threshold.

If the determining engine 207 determines to send the second notification, the notification module 209 sends 418 the second notification to the first user. In some instances, the notification module 209 includes time that elapsed between taking the first photo and the second photo in the second notification sent to the first user. The controller 201 receives 420 a reaction from the first user responsive to receiving the second notification. For example, the first user comments on the second photo or shares the second photo with a group of users.

If the determining engine 207 determines not to send the second notification, the method 400 moves to step 422, where the methods 400 ends.

Figure 5:
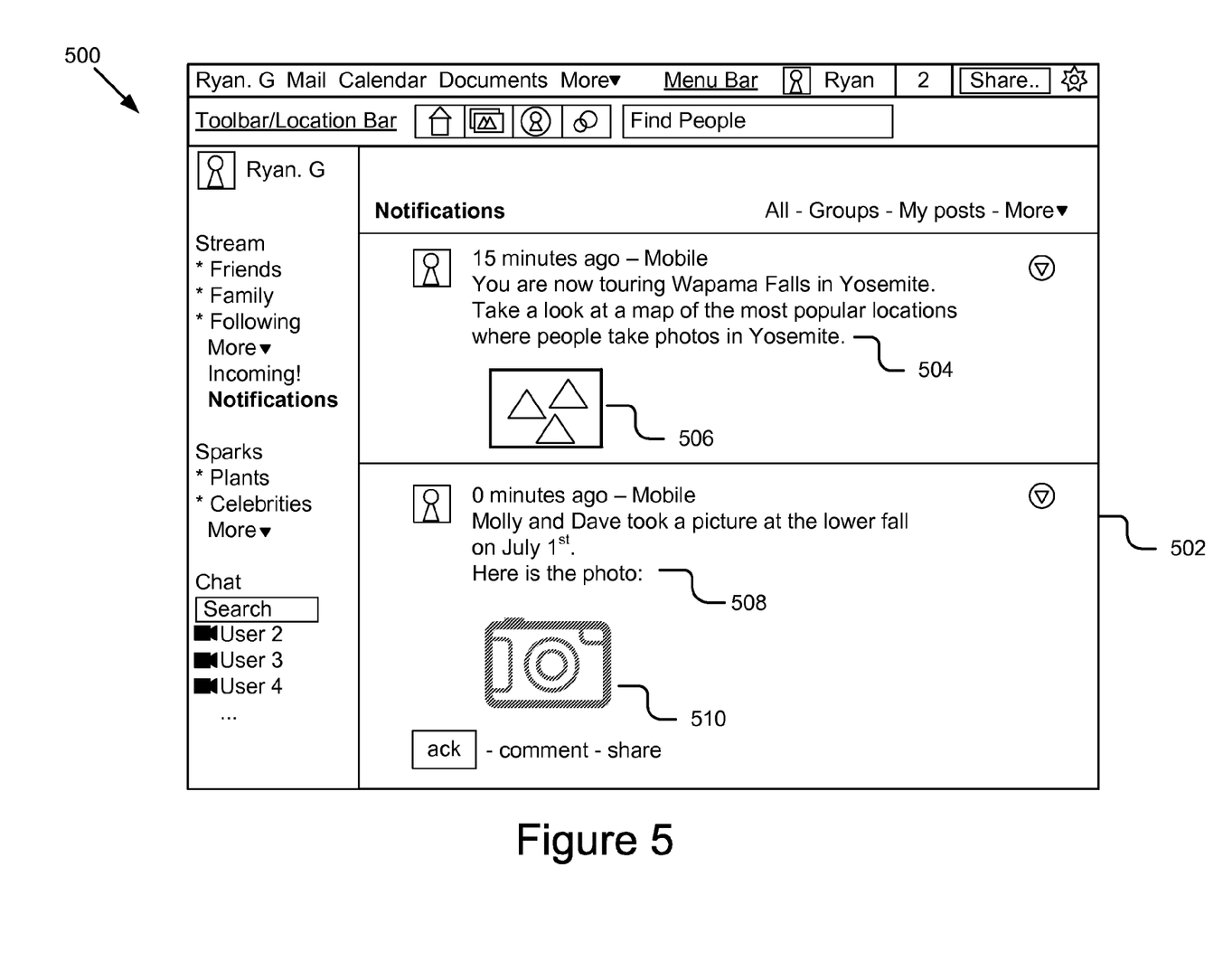
FIG. 5 is a graphic representation of an example user interface for displaying a notification.

FIG. 5 is a graphic representation of an example user interface 500 generated by the user interface engine 211. In this example, the user interface 500 displays a stream 502 for Ryan. G in a social network. The stream includes notifications from Ryan's connections in the social network for Ryan to view. The identification module 205 determines that Ryan is touring Wapama Falls in Yosemite and browsing pictures of Yosemite. The notification module 209 sends a notification 504 to Ryan to tell him that a heat map 506 is generated by the identification module 205. The heat map 506 lists most popular locations that people take photos in Yosemite. Ryan can refer to the heat map 506 to know where to take photos. For example, based on the heat map 506, Ryan decides to go to the lower fall in Yosemite. When Ryan arrives at the lower fall, the notification module 209 sends a notification 508 to notify Ryan that Molly and Dave took a picture in the lower fall on July $1^{st}$ in response to receiving a determination to send the notification from the determining engine 207. The determining engine 207 determines to notify Ryan about the photo of Molly and Dave because Ryan wants to receive notifications from members of his travel group in the social network. Molly and Dave are known as very good photographers in the travel group. The notification 508 includes the photo 510 from Molly and Dave. Ryan can react to the notification 508. For example, Ryan decides to take a photo in the lower fall to know what has changed since Molly and Dave's visit in July or to share the photo and feelings of touring the lower fall with Molly and Dave. The determining engine 207 determines to share the new photo of Ryan with Molly and Dave because Molly and Dave frequently interact with Ryan and an amount of interactions in a specific time exceeds a threshold. The notification module 209 then sends a notification to Molly and Dave for sharing the new photo from Ryan.

In the following description, for purposes of explanation, numerous specific details are set forth in order to provide a thorough understanding of the specification. It will be apparent, however, to one skilled in the art that the technology can be practiced without these specific details. In other instances, structures and devices are shown in block diagram form in order to avoid obscuring the description. For example, the specification is described in some instances above with reference to user interfaces and particular hardware. However, the description applies to any type of computing device that can receive data and commands, and any peripheral devices providing services.

Reference in the specification to "some instances" or "an instance" means that a particular feature, structure, or characteristic described in connection with the instance is included in at least some instances of the description. The appearances of the phrase "in some instances" in various places in the specification are not necessarily all referring to the same instance.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware instances, an entirely software instance or instances containing both hardware and software elements. In some instances, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the instances of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
receiving, with one or more computing devices, a first photo taken by a first user via a first user device, the first user being associated with a social network;
determining, with the one or more computing devices, a first location of the first photo;
determining, with the one or more computing devices, a second location of a second user via a second user device, the second user having a connection with the first user in the social network;
determining, with the one or more computing devices, whether the first location of the first photo matches the second location of the second user;
sending, with the one or more computing devices, a first notification to the second user, the first notification including the first photo;
responsive to sending the first notification to the second user, receiving, with the one or more computing devices, a second photo taken by the second user at the second location via the second user device;
responsive to the receiving the second photo taken by the second user, sending, with the one or more computing devices, a second notification including the second photo to the first user and an indication of a time that elapsed between taking the first photo and the second photo; and receiving, with the one or more computing devices, a reaction from the first user responsive to the first user receiving the second notification.

2. The method of claim 1, further comprising determining whether to send the second photo to the first user based on an affinity score between the first user and the second user.

3. The method of claim 1, further comprising determining whether to send the second photo to the first user based on a threshold amount of interactions between the first user and the second user.

4. The method of claim 1, further comprising:
applying a first category to the first photo;
receiving a second category from the second user; and
filtering the first photo based on whether the first category matches the second category, wherein sending the first notification to the second user is responsive to the first category matching the second category.

5. The method of claim 1, further comprising:
applying a first category to the first photo; and
generating graphical data for displaying a heat map associated with the first category that includes an indicator to signify that the first photo is related to the first category.

6. The method of claim 1, wherein determining the first location comprises extracting metadata from the first photo.

7. The method of claim 1, wherein determining the first location comprises receiving a user input from the first user about the first location.

8. The method of claim 1, wherein the reaction from the first user includes a comment made by the first user in association with the second photo.

9. The method of claim 1, further comprising sending the second notification to a group associated with the first user in the social network.

10. The method of claim 1, further comprising determining timestamps associated with the first photo and the second photo and wherein the time that elapsed between taking the first photo and the second photo is determined based on the timestamps associated with the first photo and the second photo.

11. The method of claim 1, wherein sending the second notification to the first user further comprises at least one of putting the second notification in a stream of the social network and displaying a direct message in a notification box.

12. A system comprising:
one or more processors, the processors being configured to:
receive a first photo taken by a first user via a first user device, the first user being associated with a social network;
determine a first location of the first photo;
determine a second location of a second user via a second user device, the second user having a connection with the first user in the social network;
determine whether the first location of the first photo matches the second location of the second user;
send a first notification to the second user, the first notification including the first photo;
responsive to the first notification being sent to the second user, receive a second photo taken by the second user at the second location via the second user device;
responsive to the second photo taken by the second user being received, send a second notification including the second photo to the first user and an indication of a time that elapsed between taking the first photo and the second photo; and
receive, with the one or more computing devices, a reaction from the first user responsive to the first user receiving the second notification.

13. The system of claim 12, wherein the one or more processors are further configured to determine whether to send the second photo to the first user based on an affinity score between the first user and the second user.

14. The system of claim 12, wherein the one or more processors are further configured to determine whether to send the second photo to the first user based on a threshold amount of interactions between the first user and the second user.

15. The system of claim 12, wherein the one or more processors are further configured to:
apply a first category to the first photo;
receive a second category from the second user; and
filter the first photo based on whether the first category matches the second category, wherein sending the first notification to the second user is responsive to the first category matching the second category.

16. The system of claim 12, wherein the one or more processors are further configured to:
apply a first category to the first photo; and
generate graphical data for displaying a heat map associated with the first category that includes an indicator to signify that the first photo is related to the first category.

17. A computer program product comprising a non-transitory computer usable medium including a computer readable program, wherein the computer readable program when executed on a computer causes the computer to:
receive a first photo taken by a first user via a first user device, the first user being associated with a social network;
determine a first location of the first photo;
determine a second location of a second user via a second user device, the second user having a connection with the first user in the social network;
determine whether the first location of the first photo matches the second location of the second user;
send a first notification to the second user, the first notification including the first photo;
responsive to the first notification to the second user being sent, receive a second photo taken by the second user at the second location via the second user device;
responsive to the second photo taken by the second user being received, sending a second notification including the second photo to the first user and an indication of a time that elapsed between taking the first photo and the second photo; and
receive, with the one or more computing devices, a reaction from the first user responsive to the first user receiving the second notification.

18. The computer program product of claim 17, wherein the computer readable program when executed on the computer further causes the computer to determine whether to send the second photo to the first user based on an affinity score between the first user and the second user.

19. The computer program product of claim 17, wherein the computer readable program when executed on the computer further causes the computer to determine whether to send the second photo to the first user based on a threshold amount of interactions between the first user and the second user.

20. The computer program product of claim 17, wherein the reaction from the first user includes a comment made by the first user in association with the second photo.

* * * * *